United States Patent [19]
Petruchik et al.

[11] Patent Number: 5,930,545
[45] Date of Patent: Jul. 27, 1999

[54] CAMERA WITH SPACE-SAVING ELASTOMERIC SWITCH

[75] Inventors: Dwight J. Petruchik, Honeoye Falls; Donald P. McGinn, Palmyra; Robert G. Capurso, Bergen, all of N.Y.

[73] Assignee: Eastman Kodak Company, Rochester, N.Y.

[21] Appl. No.: 08/970,049

[22] Filed: Nov. 13, 1997

[51] Int. Cl.⁶ ................................................. G03B 17/24
[52] U.S. Cl. ........................................ 396/542; 396/543
[58] Field of Search .................................. 396/543, 176, 396/179, 205, 299, 535, 542

[56] References Cited

U.S. PATENT DOCUMENTS

5,574,337  11/1996  Dunsmore .
5,592,255   1/1997  Wakabayashi et al. .................. 396/542
5,669,026   9/1997  Tanaka .

*Primary Examiner*—David M. Gray
*Attorney, Agent, or Firm*—Robert Luke Walker

[57] ABSTRACT

A camera having an exposure system and including an electrical function board, such as a flash board, operatively coupled to the exposure system. A cover closely adjoins the electrical function board and has an opening that exposes a part of the board including a contact pad and a protruding subunit closely adjoins the contact pad. The opening has a rimless margin. An elastomeric button is disposed in the opening. The button has a bridge and a conductive puck connected to the bridge. The button is resiliently deformable from a non-actuated conformation, in which the puck is spaced apart from the contact pad, to an actuated conformation, in which the puck shorts the contact pad. The bridge overlies the protruding subunit in both conformations. The bridge has an excursion that is insufficient to substantially transmit force to the protruding subunit.

26 Claims, 5 Drawing Sheets

CAMERA WITH SPACE-SAVING ELASTOMERIC SWITCH

FIELD OF THE INVENTION

The invention relates to photographic cameras and more particularly relates to a camera having a space-saving elastomeric switch.

BACKGROUND OF THE INVENTION

Many cameras, including one-time-use cameras, use a push-button "dome switch" on the camera to start the charging of an integrated flash unit. Traditionally, the switch carried a high current and used large metal parts that required a large dedicated area of a respective circuit board. U.S. Pat. No. 5,574,337 discloses a flash unit having reduced current through a momentary switch. U.S. Pat. No. 5,669,026 discloses a camera having a small, low-current, elastomeric push-button switch. The button extends through a hole in the cover of the camera. The button, itself has a conductive contact portion that is pressed against electrodes of a non-flash circuit board. This button uses less area of a circuit board than the dome switch, but still uses a relatively large dedicated area of the board. An outer edge of the button rests on the board. A flexural portion of the button, in from the outer edge, rests on an inwardly extending rim of the hole.

It would thus be desirable to provide an improved camera in which an elastomeric button switch requires a very small dedicated area on a circuit board.

SUMMARY OF THE INVENTION

The invention is defined by the claims. The invention, in its broader aspects, provides a camera having an exposure system and including an electrical function board, such as a flash board, operatively coupled to the exposure system. A cover closely adjoins the electrical function board and has an opening that exposes a part of the board including a contact pad and a protruding subunit closely adjoins the contact pad. The opening has a rimless margin. An elastomeric button is disposed in the opening. The button has a bridge and a conductive puck connected to the bridge. The button is resiliently deformable from a non-actuated conformation, in which the puck is spaced apart from the contact pad, to an actuated conformation, in which the puck shorts the contact pad. The bridge overlies the protruding subunit in both conformations. The bridge has an excursion that is insufficient to substantially transmit force to the protruding subunit.

It is an advantageous effect of at least some of the embodiments of the invention that an improved camera is provided in which an elastomeric button switch requires a very small dedicated area on a circuit board.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
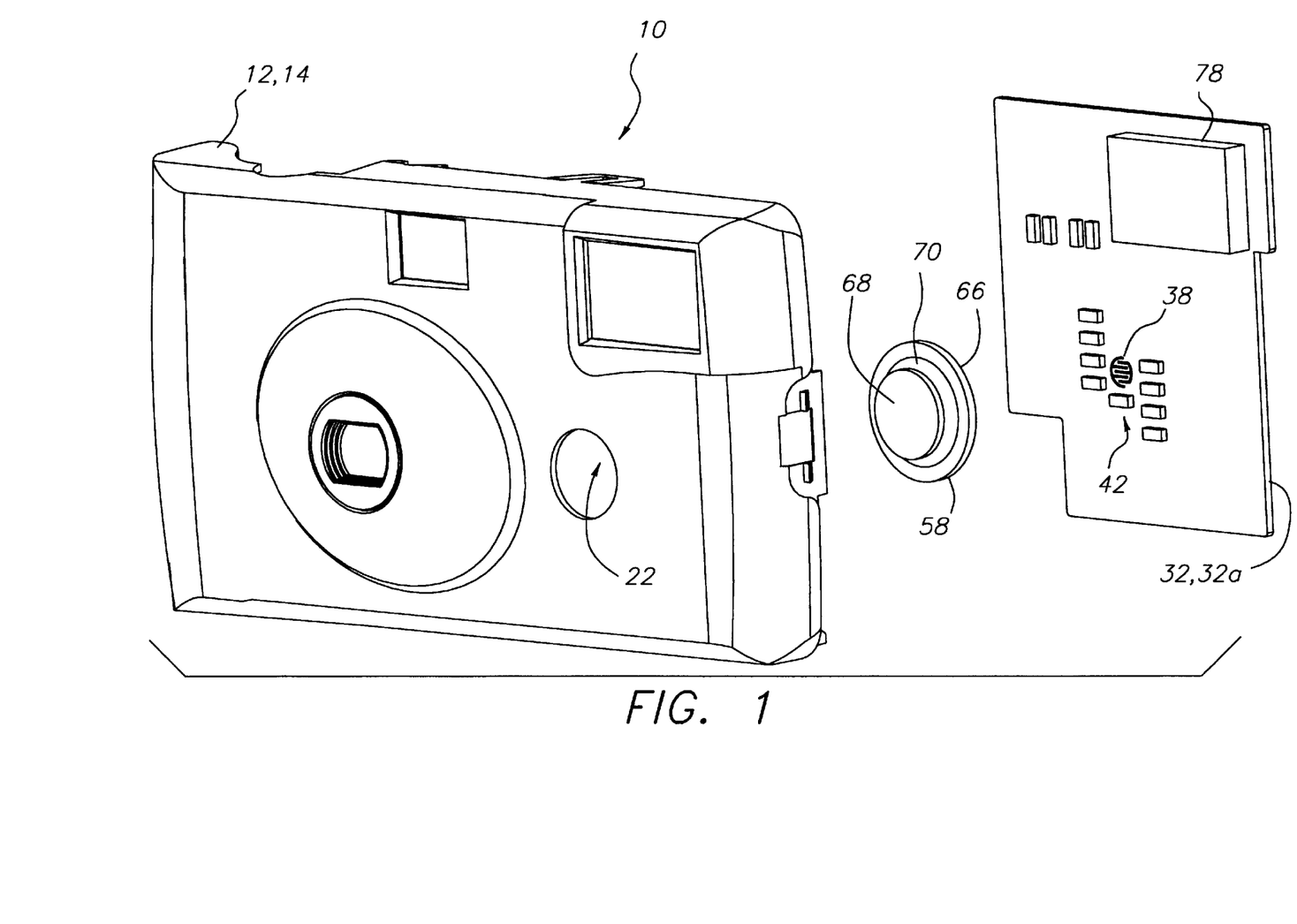
FIG. 1 is an exploded view of the front cover panel, button, and flash board of an embodiment of the camera of the invention.
Figure 2:
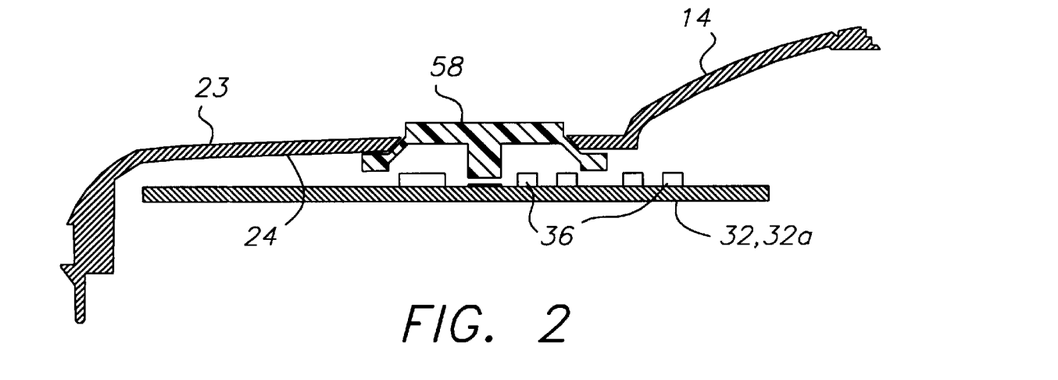
FIG. 2 is a semi-diagrammatical, top, longitudinal cross-sectional view of the camera of FIG. 1.
Figure 3:
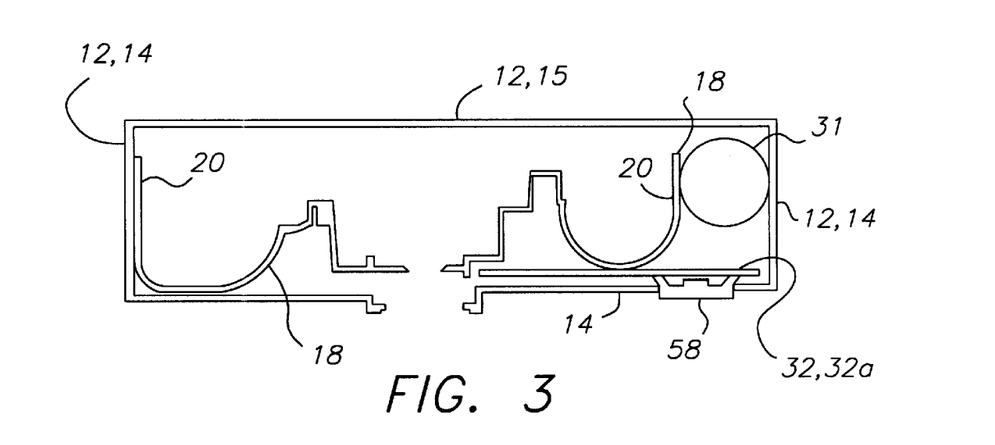
FIG. 3 is a partial top, longitudinal view of the camera of FIG. 1 showing part of the front cover panel, the button, and the flash board.

The improved camera 10 has a cover 12 that includes a front panel 14 and a rear panel 15. An exposure system 16 is disposed within the cover 12. FIG. 3 illustrates the frame 18 of an exposure system 16. The frame 18 has a pair of film chambers 20. Not shown are other standard components of the exposure system, well known to those of skill in the art; such as: film, a lens system, film transport and metering elements, and a shutter system. The camera 10 can be intended for one-time-use use or can be reusable. The cover 12 has an opening 22. In the embodiment shown in the figures, the opening 22 is in the front panel 14.

Figure 7:
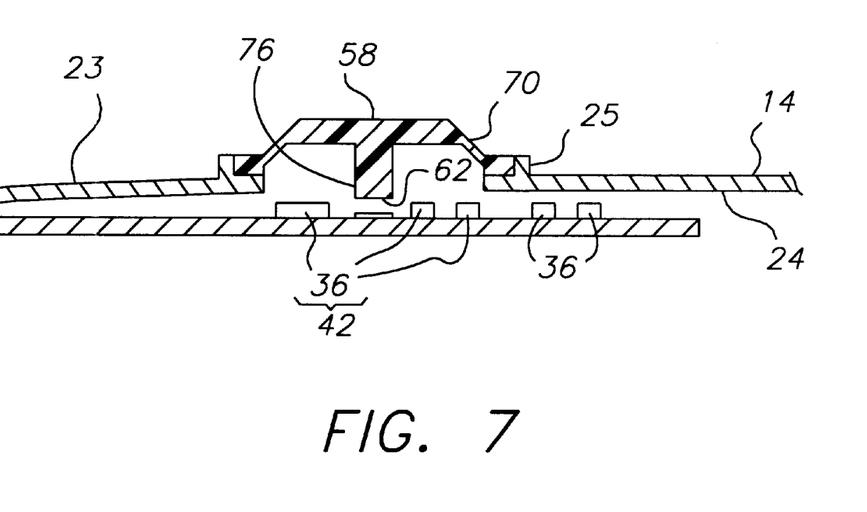
FIG. 7 is a partial top, longitudinal view of an alternative embodiment of the camera of the invention showing part of the front cover panel, the button, and the flash board.
Figure 8:
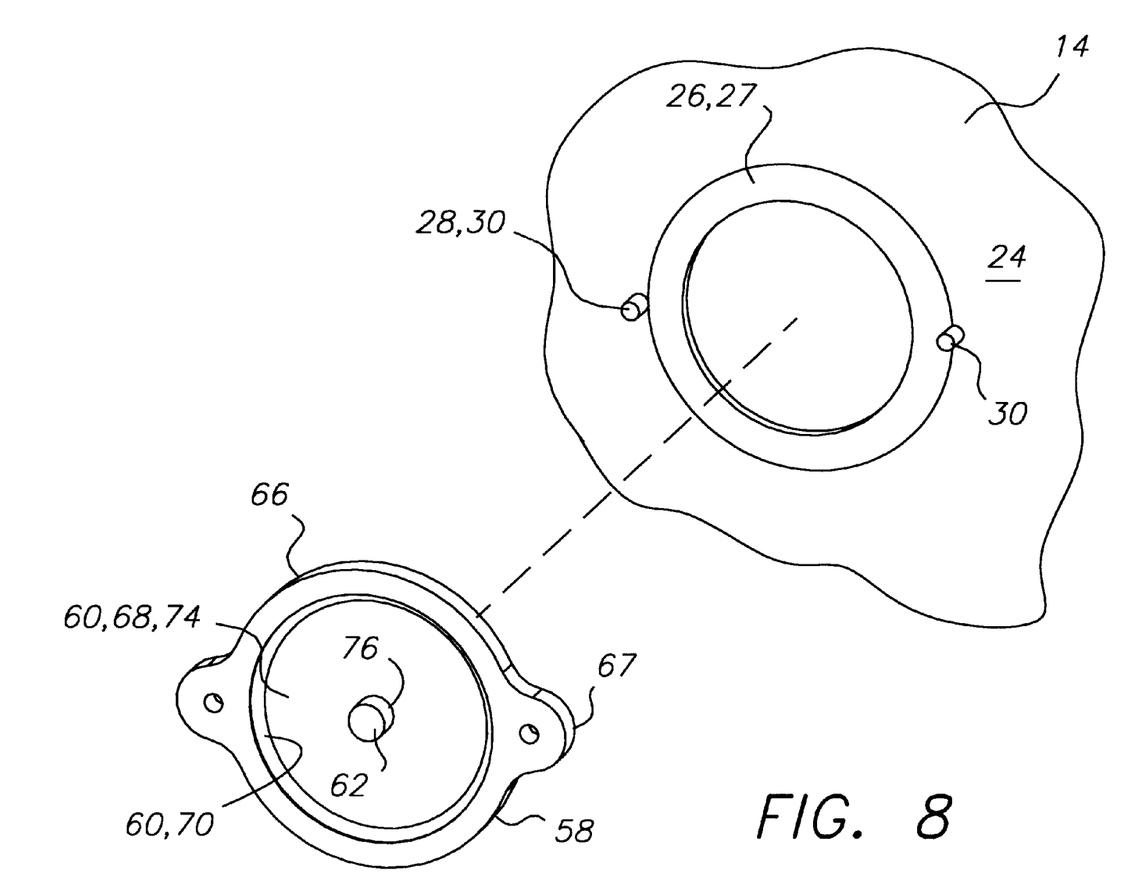
FIG. 8 is an exploded, partial, rear perspective view of the front cover and button of another embodiment of the camera of the invention.

The cover 12 on its inside surface 24 has a rimless margin 26 surrounding the opening 22. In the figures, the rimless margin 26 is most noticeable in the camera section shown in FIG. 4. The outside surface 23 can be rimless as shown in FIGS. 1–4, or can include a rim 25, as shown in FIG. 7. All illustrated portions of the inside surface 24 of the cover 12, including the margin 26, lie in a common plane extending perpendicular to the page. The cover 12 can have a button attachment feature 28 on the inside surface 24, offset from said margin 26. The button attachment feature 28 can be continuous in the form of a collar or can be discontinuous. In the embodiment shown in FIG. 8, the button attachment feature 28 is discontinuous and consists of one or more pins 30 that extend inward from the inside surface 24 of the cover 12.

Interior to the cover 12 is an electrical function board 32. The electrical function board 32 is coupled to the exposure system 16. The exact nature of this coupling depends upon the nature of the electrical function board 32. The provision of electrical functions to camera 10 operations is well known to those of skill in the art. The electrical function board 32 includes a circuit board 34, such as a printed circuit board, and electrical components 36 mounted to the circuit board 34. The electrical function board 32 has a contact pad 38 in which two conductors 39,41 are separated by a gap 40. The conductors 39,41 of the contact pad 38 define a reference plane. In the embodiment shown in the figures, the contact pad 38 is a section of circuit trace on the circuit board 34 and the reference plane extends through the surface of the circuit board 34.

The electrical function board 32 has a protruding subunit 42 that extends outward from the contact pad 38, in a direction perpendicular to the reference plane of the circuit board 34. The protruding subunit 42 closely adjoins the contact pad 38 and includes one or more electrical components 36. The nature of the electrical components 36 is determined by the purpose of the electronic function board 32. Examples of components 36 are discrete resistors, capacitors, transformers, socketed or unsocketed integrated circuit chips, and the like. In the embodiment shown in the figures, the protruding subunit 42 consists of one or more electrical components 36 surface mounted to the printed circuit board 34. The protrusion of the protruding subunit 42, in this embodiment, is the height dimension (out from the circuit board 34) of the circuit components 36.

Figure 5:
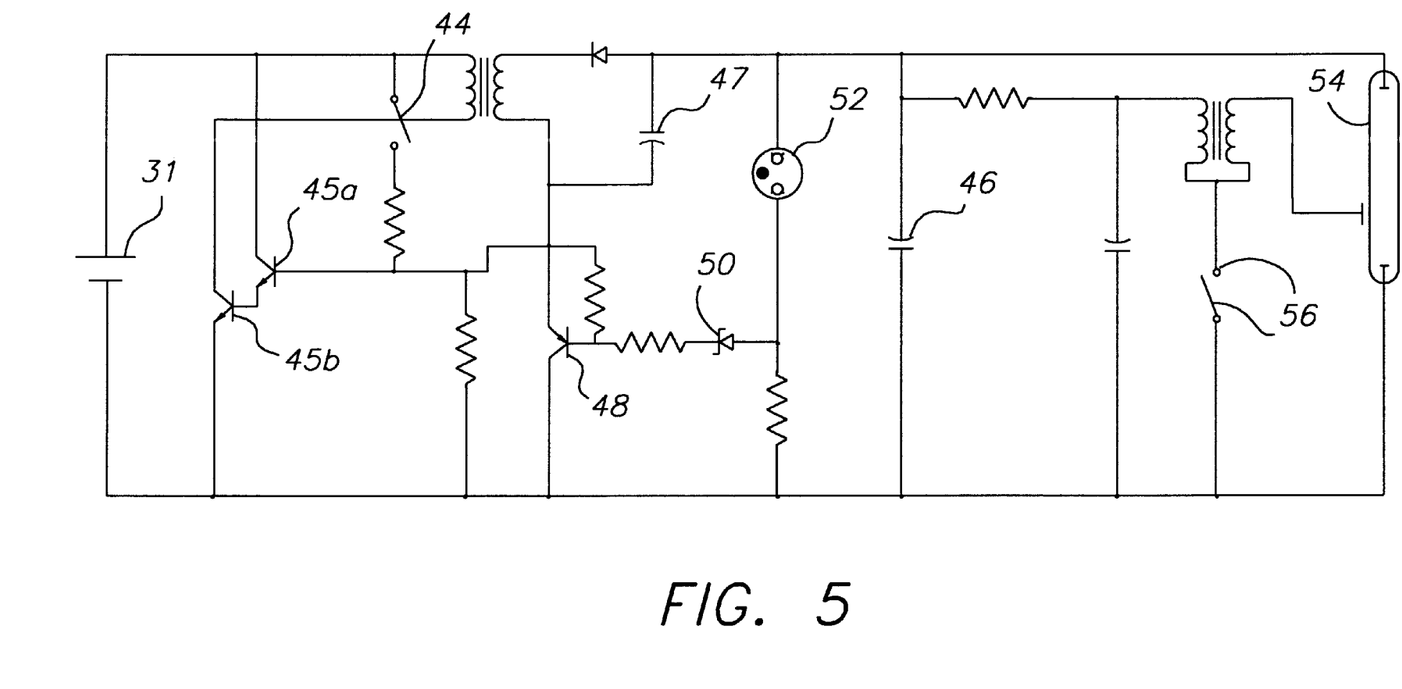
FIG. 5 is a schematic diagram of the flash board electrical circuit of the camera of FIG. 1.
Figure 6:
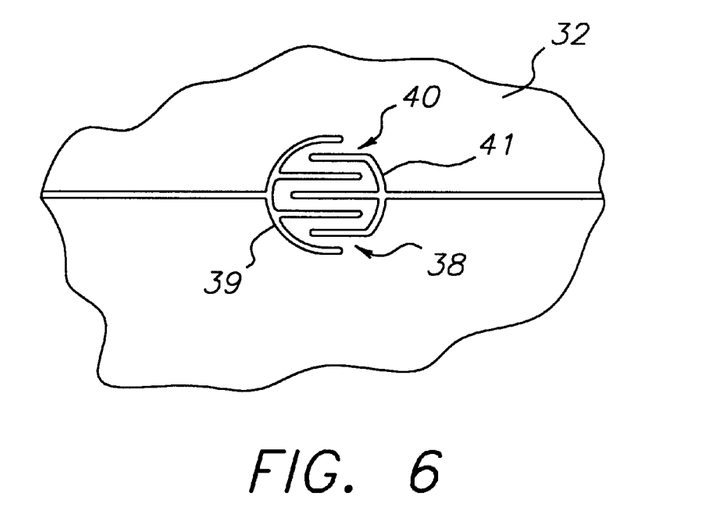
FIG. 6 is a partial plan view of the circuit board of the camera of FIG. 1 showing the contact pad.

In the figures, the electrical function board 32 is a flash board 32a including a circuit board 34 and an enclosed flash tube housing. The circuit 33 of the flash board 32a is shown in FIG. 5. This circuit 33 is a self-oscillating charging circuit including tandem connected transistors 45a and 45b, powered by a battery 31. A momentary switch 44 triggers initial oscillations of the circuit 33 to charge a flash capacitor 46. A voltage sensing circuit coupled directly between the charging circuit and the flash capacitor 46 arrests the oscillations when the capacitor is fully charged. The voltage sensing circuit includes a transistor 48, and a zener diode 50 in series with a neon ready light 52. When the capacitor 46 is fully charged, the transistor 48 is switched on, momentarily grounding the charging circuit at the base of transistor 45a, thereby arresting the oscillations. Firing of the flash unit 32a discharges the flash capacitor 46 through the flash tube 54. A feedback pulse via capacitor 47 to the base of transistor 45a automatically restarts the oscillations and recharges the flash capacitor 46. The flash board 32a illustrated is coupled to the exposure system 16 by a pair of synchronization contacts 56, that are closed, as required, by the shutter system (not shown) during film exposure.

Figure 4:
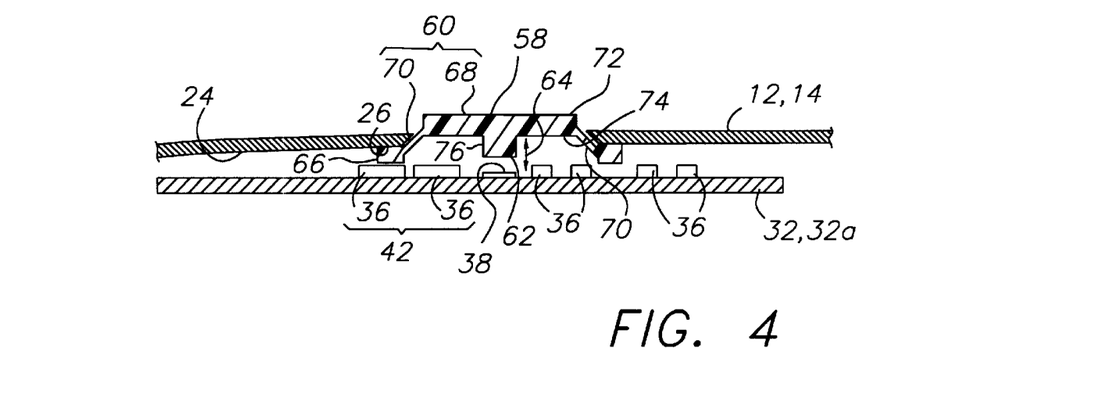
FIG. 4 is a partial enlarged of the view of FIG. 3.

The cover 12 closely adjoins the electrical function board 32. The contact pad 38 and protruding subunit 42 directly underlie the opening 22, and are uncovered by the opening 22. The protruding subunit 42 may, in addition, underlie the rimless margin 26 of the opening 22, as shown in FIG. 4.

An elastomeric button 58 is disposed in the opening 22. The button 58 and contact pad 38 together comprise the momentary switch 44. The button 58 has a bridge 60 that extends over and, preferably, closes the opening 22. The button 58 also has a conductive puck 62 that is connected to the bridge 60. The button 58 is resiliently deformable from a non-actuated conformation, in which the puck 62 is spaced apart from the contact pad 38, to an actuated conformation, in which the puck 62 shorts the contact pad 38. Directions of movement of the puck 62 between the conformations are indicated by double-headed arrow 64 in FIG. 4.

The bridge 60 is joined to and moves along with the puck 62 and overlies the protruding subunit 42 in both conformations. The bridge 60 is, in effect, undercut over the protruding subunit 42; such that, during alteration of the button 58 between the actuated and non-actuated conformations, the excursion of the bridge 60 is insufficient for the bridge 60 to substantially transmit force to the protruding subunit 42. An insubstantial transmission of force is too low in magnitude to alter the position or condition of mounted electrical components 36 in the protruding subunit 42. Too provide a safety margin, it is preferred that the bridge 60 remain spaced apart from the protruding subunit 42 in both actuated and non-actuated conformations.

The bridge 60 is joined to and contiguous with a tie portion 66. The tie portion 66 retains the button 58 in position relative to the electrical function board 32. Referring to FIG. 4, the tie portion 66 can be disposed between the cover 12 and the electrical function board 32 and can be trapped between the cover 12 and the board 32, or can be attached to the inside surface 24 of the cover 12, or to the board 32, or to both. The tie portion 66 can also be attached to the outside surface of the cover 12, as shown in FIG. 7. The attachment can be provided by heat fusing, or fastener, or adhesive, or the like. Some methods of attachment, such as heat fusing, can be used to provide a watertight seal between the button 58 and the cover 12 panel 14. In the embodiment shown in FIG. 8, the tie portion 66 is bonded to the margin 26, by an annular adhesive layer 27, and ears 67 of the tie portion 66 are fit over pins 30. The materials of the button 58 and cover 12 can be selected so that both parts are commonly recyclable, that is, the parts can be intermixed for use as chemical feedstock. Examples of such materials include: a cover 12 of polystyrene and a button 58 of styrene block copolymer.

The shapes of the bridge 60 and tie portion 66 are determined by the shape of the opening 22 in the cover 12. Convenient shapes, shown in the figures, are annular for the tie portion 66 and roughly the shape of an inverted, circular dinner plate for the bridge 60. The tie portion 66 and bridge 60 are not limited to a shape with a circular outline, but can also have a rectangular or irregular outline. The opening 22 is preferably complementary to the shape of the bridge 60; but can, if desired, extend over a larger area. For example, an opening 22 could be oversized and be partially covered by the bridge 60 and partially covered by additional camera structure (not shown).

The bridge 60 has an actuation section 68 that generally fills the opening 22, and a prop section 70 that connects the actuation section 68 to the tie portion 66. The actuation section 68 has an outer face 72 that can be configured as desired for a particular use. For example, the outer face 72 can match or parallel the outer dimensions of the cover 12, or can have a complex shape. The outer face 72 can have a discernibly different color than said cover 12. (One or more colorants can be added to all or part of the button as desired.) Relief features can also be provided that allow the user to more easily recognize the button 58 by feel. The actuation section 68 has an inner face 74 that is spaced apart, relative to the prop section 70, and is preferably flat and uniform so as to maximize the area under the bridge 60.

The prop section 70 of the bridge 60 is shaped so as to resiliently distort under a compressive force directed against the actuation section 68 toward the electrical function board 32. The distortion resembles that of a flexed oil can, and for this reason can be referred to as "oil-canning". Elastomeric buttons exhibiting this behavior are well known and have the advantage of providing an easily noticeable tactile change to the user when actuated. The distortion of the prop section 70 causes the actuation section 68 to move toward the electrical function board 32 and the button 58 to assume the actuated conformation. Removal of the force on the actuation section 68 allows the actuation section 68 to resiliently move back away from the electrical function board 32 and the button 58 to assume the non-actuated conformation.

A convenient bridge 60 having the shape shown in FIG. 4, has an actuation section 68 with a thickness, in a direction perpendicular to the larger dimensions of the board 32, of from about 1 mm to about 5 mm, or more preferably about 1.5 mm. This bridge 60 has an annular prop section 70, that slants at roughly a 45 degree angle inward from the tie portion 66 to the actuation section 68 and has a thickness, its smallest dimension, in the range of from about 0.5 mm to about 1.0 mm, or more preferably about 0.5 mm.

The puck 62 is an electrically conductive layer that is aligned with the contact pad 38 and is connected to the bridge 60 by a pillar 76. The pillar 76 is, preferably, contiguous with the bridge 60 and centered relative to the prop section 70. The puck 62 and pillar 76 together have a height in a direction outward from the electrical function board 32 greater than the height of the protruding subunit 42 in the same direction. The puck 62 has transverse dimensions, in directions parallel to the larger dimensions of the board 32, about the same size as the contact pad 38, in the same directions, and smaller than the outer face 72 of the bridge 60, in the same directions. Since the bridge 60 overlies the protruding subunit 42, the dedicated area of the circuit board 34 required by the button 58 is very small, about the same size as the area occupied by the puck 62 and the contact pad 38. It is preferred that the puck 62 and contact pad 38 have transverse dimensions less than one-half, or more preferably less than one-quarter, of each of the transverse dimensions of the outer face 72 of the bridge 60 in the same directions. These relative dimensions allow for easy manipulation of the button 58 by the user, without wasting space on the electrical function board 32. In the flash board 32a shown in the figures, the contact pad 38 has a dedicated area that is about one-tenth of the area of the circuit board 34 that lies under the button 58, and about 0.6 percent of the total area of the flash board 32a.

The puck 62 can be a layer of metal or can be another conductor such as carbon attached to or impregnated in the material of the remainder of the button 58. The entire button 58 can be conductive, however, this is undesirable since such a conductive button could present an intermittent ground in the circuit of the electrical function board. The puck 62 has a thickness, in view of its conductivity, sufficient to short the contact pad 38 without undue resistance. In embodiments of the invention using the circuit of FIG. 5, the puck 62 can be a carbon containing layer and the electrical circuit of the board 32 can limit amperage across the contact pad 38 to less than about 0.05 amps, or preferably to less than about 0.03 amps. In a particular embodiment of the invention, the amperage is less than 0.01 amps.

Because the bridge 60 directly overlies the protruding subunit 42, the electrical components 36 of the protruding subunit 42 are unprotected, by the cover 12, from physical impacts. For this reason it is desirable that the actuation section 68 be impact resistant, that is, sufficiently tough to protect against ready physical intrusion of objects into the camera 10 interior. This function can be provided by configuring the bridge 60 such that deformation during use is limited to the prop section 70, such that the actuation section 68 does not flex or noticeably distort when the button 58 is switched between non-actuated and actuated configurations. In combination with the cover 12 and the flash tube housing 78, a button 58 having such an impact resistant actuation section 68 provides a physical barrier around the flash board 32a and substantially isolates the flash circuit 33 from physical intrusion.

In use, the operator presses against the outer face 72 of the bridge 60 and the button 58 assumes a stressed conformation in which the puck 62, opposite the outer face 72, is moved against the contact pad 38. This closes a circuit provided in the electrical function board 32, providing a desired function. The force is released and the button 58 resiliently assumes a relaxed conformation in which the puck 62 is spaced apart from the contact pad 38. In both the stressed and the relaxed conformations, the protruding subunit 42 of the electrical function board 32 remains continuously offset from the bridge 60 of the button 58.

The invention has been described in detail with particular reference to certain preferred embodiments thereof, but it will be understood that variations and modifications can be effected within the spirit and scope of the invention.

Parts list camera 10
cover 12
front panel 14
rear panel 15
exposure system 16
frame 18
film chambers 20
opening 22
outside surface 23
inside surface 24
margin 26
button attachment feature 28
pins 30
battery 31
electrical function board 32
flash board 32a
circuit 33
circuit board 34
electrical components 36
contact pad 38
conductors 39,41
gap 40
protruding subunit 42
momentary switch 44
flash capacitor 46
transistor 48
zener diode 50
neon ready light 52
flash tube 54
synchronization contacts 56
elastomeric button 58
bridge 60
puck 62
double-headed arrow 64
tie portion 66
ears 67
actuation section 68
prop section 70
outer face 72
inner face 74
pillar 76
flash tube housing 78

What is claimed is:

1. A camera comprising:

an exposure system;

an electrical function board operatively coupled to said exposure system, said electrical function board having a contact pad and a protruding subunit closely adjoining said contact pad;

a cover closely adjoining said electrical function board, said cover having an opening uncovering said contact pad, said protruding subunit protruding from said electrical function board toward said opening;

an elastomeric button having a bridge and a conductive puck connected to said bridge, said button being resiliently deformable from a non-actuated conformation wherein said puck is spaced apart from said contact pad to an actuated conformation wherein said puck shorts said contact pad, said bridge overlying said protruding subunit in both said conformations, said bridge having an excursion insufficient to substantially transmit force to said protruding subunit.

2. The camera of claim 1 wherein said bridge closes said opening.

3. The camera of claim 1 wherein said protruding subunit includes a plurality of electrical components underlying said bridge.

4. The camera of claim 1 wherein said electrical function board is a flash board.

5. The camera of claim 4 wherein said flash board includes a flash circuit and a flash tube housing, and said cover, said button, and said flash tube housing substantially isolate said flash circuit from physical intrusion.

6. The camera of claim 4 wherein said flash board has an electrical circuit in which amperage across said contact pad is limited to less than about 0.05 amps.

7. The camera of claim 1 wherein said bridge is spaced apart from said protruding subunit in both said conformations.

8. The camera of claim 1 wherein said bridge has an outer face opposite said puck, and said puck has transverse dimensions, in directions parallel to larger dimensions of said flash board, about the same size as said contact pad, in the same directions, and less than one-half of each of the transverse dimensions of said outer face, in the same directions.

9. The camera of claim 8 wherein said transverse dimensions of said puck are each less than one-quarter of each of said transverse dimensions of said outer face.

10. The camera of claim 1 wherein said button is mounted to said cover.

11. The camera of claim 1 wherein said button is mounted to said cover exterior to said electrical function board.

12. The camera of claim 1 wherein said electrical function board includes a circuit board and said protruding subunit includes at least one electronic component surface mounted to said circuit board; and said bridge is adapted to resiliently oil-can under a compressive force directed toward said electrical function board.

13. The camera of claim 1 wherein said button and said cover are each composed of materials recyclable together as chemical feedstock.

14. A camera comprising:

an exposure system;

a electrical function board operatively coupled to said exposure system, said electrical function board having a contact pad and at least one surface mounted electrical component closely adjoining said contact pad;

a cover closely adjoining said electrical function board, said cover having an opening uncovering said contact pad, said electrical component protruding from said electrical function board toward said opening;

an elastomeric button closing said opening, said button having a bridge and a conductive puck connected to said bridge, said button being resiliently deformable from a non-actuated conformation wherein said puck is spaced apart from said contact pad to an actuated conformation wherein said puck shorts said contact pad, said bridge overlying and being spaced apart from said electrical component closely adjoining said contact pad, in both said conformations;

an elastomeric button having a conductive puck resiliently movable against said contact pad, a bridge overlying and continuously offset from said electrical component closely adjoining said contact pad, and a pillar joining said puck to said bridge, said puck and said pillar together having a height in a direction outward from said electrical function board greater than the height of said electrical component closely adjoining said contact pad, in the same direction.

15. The camera of claim 14 wherein said electrical function board is a flash board having a flash tube housing and an electrical circuit including a contact pad, said circuit limiting amperage across said contact pad to less than about 0.03 amps.

16. A camera comprising:

an exposure system;

an electrical function board operatively coupled to said exposure system, said electrical function board having a circuit including a contact pad;

a cover closely adjoining said electrical function board, said cover having an inside surface, said cover having an opening uncovering said contact pad, said cover having a rimless margin surrounding said opening on said inside surface;

an elastomeric button closing said opening, said button being joined to said inside surface, said button having a conductive puck resiliently movable against said contact pad.

17. The camera of claim 16 wherein said electrical function board is a flash board having a flash tube housing and an electrical circuit including a contact pad.

18. The camera of claim 16 wherein said circuit limits amperage across said contact pad to less than about 0.05 amps.

19. The camera of claim 16 wherein said cover has a button attachment feature on said inside surface, offset from said margin.

20. The camera of claim 19 wherein said feature is at least one pin affixed to said cover on said inside surface and extending toward said board.

21. The camera of claim 20 further comprising an annular adhesive layer bonding said button to said margin.

22. The camera of claim 16 wherein said electrical function board has a protruding subunit extending toward said cover; and said button includes said puck and a bridge connected to said puck, said button being resiliently deformable from a non-actuated conformation wherein said puck is spaced apart from said contact pad to an actuated conformation wherein said puck is moved against and shorts said contact pad, said bridge overlying said protruding subunit in both said conformations, said bridge having an excursion insufficient to substantially transmit force to said protruding subunit.

23. The camera of claim 22 wherein said rimless margin overlies said protruding subunit.

24. A camera comprising:

an exposure system;

an electrical function board operatively coupled to said exposure system, said electrical function board having a circuit including a contact pad and a protruding subunit;

a cover closely adjoining said electrical function board, said cover having an inside surface, said cover having an opening uncovering said contact pad, said protruding subunit protruding from said electrical function board toward said opening, said cover having a rimless margin surrounding said opening on said inside surface;

an elastomeric button closing said opening, said button having a conductive puck resiliently movable against said contact pad.

25. The camera of claim 24 wherein said button includes said puck and a bridge connected to said puck, said button being resiliently deformable from a non-actuated conformation wherein said puck is spaced apart from said contact pad to an actuated conformation wherein said puck is moved against and shorts said contact pad, said bridge overlying said protruding subunit in both said conformations.

26. The camera of claim 25 wherein said bridge has an excursion insufficient to substantially transmit force to said protruding subunit.

* * * * *